(12) United States Patent
Sasano et al.

(10) Patent No.: US 10,602,715 B2
(45) Date of Patent: Mar. 31, 2020

(54) ABSORBENT SHEET

(75) Inventors: Yasuhiro Sasano, Kagawa (JP);
Takeshi Ikegami, Kagawa (JP); Yumei Komuro, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 1221 days.

(21) Appl. No.: 14/232,242

(22) PCT Filed: May 17, 2012

(86) PCT No.: PCT/JP2012/062605
§ 371 (c)(1),
(2), (4) Date: Jan. 10, 2014

(87) PCT Pub. No.: WO2013/008533
PCT Pub. Date: Jan. 17, 2013

(65) Prior Publication Data
US 2014/0137805 A1 May 22, 2014

(30) Foreign Application Priority Data

Jul. 13, 2011 (JP) ................................. 2011-155218

(51) Int. Cl.
*A01K 1/01* (2006.01)

(52) U.S. Cl.
CPC .................................. *A01K 1/0107* (2013.01)

(58) Field of Classification Search
CPC .. A01K 1/0157; A01K 1/0107; A01K 1/0152; A01K 1/0155; A01K 1/0125;
(Continued)

(56) References Cited

U.S. PATENT DOCUMENTS

| | | | |
|---|---|---|---|
| 1,964,242 A * | 6/1934 | Behrle | B60N 2/60 |
| | | | 297/223 |
| 4,800,677 A * | 1/1989 | Mack | A01K 1/0107 |
| | | | 119/161 |

(Continued)

FOREIGN PATENT DOCUMENTS

| | | |
|---|---|---|
| EP | 1 048 206 A2 | 2/2000 |
| JP | 63-178451 U | 11/1988 |

(Continued)

OTHER PUBLICATIONS

Supplementary European Search Report dated Mar. 10, 2015, corresponding to European patent application No. 12811919.5.

(Continued)

*Primary Examiner* — Christopher D Hutchens
(74) *Attorney, Agent, or Firm* — Hauptman Ham, LLP

(57) ABSTRACT

An absorbent sheet includes a liquid-permeable topsheet, a liquid-impermeable backsheet and a liquid-absorbent structure interposed between the top- and backsheets. In the sheet, the topsheet faces itself and is bonded to itself by a joining means extending in a transverse direction so as to define a fold edge extending in a transverse direction. The absorbent structure includes a first absorbent section extending between a front end edge and the fold edge, a second absorbent section extending between the fold edge and the joining means and a third absorbent section extending between the joining means and a rear end edge. Outboard of the third absorbent section of the sheet in the longitudinal direction, a non-absorbent region in which the absorbent structure is not present is formed. A portion of the backsheet of the sheet within the non-absorbent region is attached to a wall by attachments.

22 Claims, 7 Drawing Sheets

(58) Field of Classification Search
CPC .......... A01K 23/005; B60R 2021/0293; B60N 2/58; B60N 2/60; B60N 2/6018; B60N 2/6027; B60N 2/6036; B60N 2/6045; B60N 2/6063; B60N 2/6072; B60N 2/6081; B60N 2/609
USPC .................................................. 119/161, 169
See application file for complete search history.

(56) References Cited

U.S. PATENT DOCUMENTS

| | | | | |
|---|---|---|---|---|
| 5,080,046 | A * | 1/1992 | Cassone | A01K 1/0125 119/165 |
| 5,762,642 | A * | 6/1998 | Coles | A61F 13/4758 604/367 |
| 6,460,484 | B2 * | 10/2002 | Ikegami | A01K 1/0107 119/161 |
| 7,249,570 | B1 * | 7/2007 | Roberson | A01K 1/0107 119/169 |
| 7,678,221 | B2 * | 3/2010 | Takahashi | A01K 1/0107 119/161 |
| 8,142,410 | B2 * | 3/2012 | Rovaniemi | A61G 13/102 428/156 |
| 8,852,717 | B2 * | 10/2014 | Davis | A01K 1/0107 119/169 |
| 2003/0088222 | A1 * | 5/2003 | Yoshimasa | A61F 13/47245 604/380 |
| 2005/0000461 | A1 * | 1/2005 | Kincaid | A01K 1/0107 119/169 |
| 2006/0191488 | A1 * | 8/2006 | Ricchiuti | A01K 1/0107 119/161 |
| 2007/0043330 | A1 * | 2/2007 | Lankhof | A61F 13/531 604/378 |
| 2007/0113793 | A1 * | 5/2007 | Kurahashi | A01K 1/0107 119/479 |
| 2007/0179468 | A1 * | 8/2007 | LaBelle | A01K 1/0107 604/385.19 |
| 2008/0223301 | A1 * | 9/2008 | Nagao | A01K 1/0107 119/161 |
| 2008/0236504 | A1 * | 10/2008 | Silverman | A01K 1/0107 119/169 |
| 2008/0254472 | A1 | 10/2008 | Inui | |
| 2008/0315643 | A1 * | 12/2008 | Beroth | B60N 2/6054 297/229 |
| 2012/0316526 | A1 * | 12/2012 | Rosati | A61F 13/532 604/366 |
| 2014/0283752 | A1 * | 9/2014 | Lowe | A01K 1/0107 119/161 |
| 2019/0239483 | A1 * | 8/2019 | Thibault | A01K 23/005 |

FOREIGN PATENT DOCUMENTS

| | | |
|---|---|---|
| JP | 2001-008568 A | 1/2001 |
| JP | 2002-000099 A | 1/2002 |
| JP | 2008-199998 A | 9/2008 |
| JP | 2008-221018 A | 9/2008 |
| JP | 2010-119313 A | 6/2010 |

OTHER PUBLICATIONS

International Search Report dated Jul. 3, 2012 in International Application No. PCT/JP2012/062605, filed May 17, 2012.

* cited by examiner

ABSORBENT SHEET

RELATED APPLICATIONS

The present application is a National Phase of International Application No. PCT/JP2012/062605, filed May 17, 2012, and claims priority from Japanese Patent Application No. 2011-155218, filed, Jul. 13, 2011.

TECHNICAL FIELD

The present invention relates to absorbent sheets and more particularly to absorbent sheets used to absorb bodily fluids, for example, urine discharged by pet animals.

BACKGROUND

Conventionally, absorbent sheets used for pet animals are known. For example, Patent Literature 1 discloses an absorbent sheet including a liquid-permeable topsheet, a liquid-impermeable backsheet and an absorbent core interposed between these sheets. This known absorbent sheet includes a flap in which the absorbent core does not exist and a region in which the absorbent core exists therein so that the region in which the absorbent core exists may be laid on the floor and the flap may be attached to the wall in use. Patent Literature 2 discloses an absorbent sheet including a water-absorbent structure and a lining vinyl-cover. In this known absorbent sheet, the water-absorbent structure is formed with a fold extending to bisect the sheet into two sections so that one of these two sections may be attached to the floor and the other section may be attached to the wall in use. In this way, it is possible for the section attached to the wall to prevent the wall from being soiled with urine even when a male dog voids against the wall.

CITATION LIST

Patent Literature

{PTL 1}: JP 2001-8568 A
{PTL 2}: JP 63-178451 U

SUMMARY

Technical Problem

However, in the absorbent sheets disclosed in Patent Literatures 1 and 2, there is a possibility that urine discharged against the section of the sheet attached to the wall might transfer downward to the section laid on the floor, diffuse in this section over a wide range and soil this section beyond the acceptability area.

An object of the present invention is to provide an absorbent sheet being capable of inhibiting urine from diffusing in the section of the sheet laid on the floor.

Solution to Problem

The present invention provides an absorbent sheet having a longitudinal direction and a transverse direction and including a liquid-permeable topsheet, a liquid-impermeable backsheet and an absorbent structure interposed between these sheets. The absorbent structure includes a first absorbent section, a second absorbent section and a third absorbent section arranged in the longitudinal direction. A portion of the topsheet extending between the second absorbent section and the third absorbent section and a portion of the topsheet extending along the first absorbent section are secured to each other by a joining means.

Advantageous Effects of Invention

With the absorbent sheet according to one or more embodiments of the present invention, in the first absorbent section, the second absorbent section and the third absorbent section arranged in the longitudinal direction, the first absorbent section and the second absorbent section are secured to each other by the joining means through the portions of the topsheet extending in the respective absorbent sections. When the third absorbent section is put in the upstanding posture relative to the first absorbent section, the second absorbent section extends from the third absorbent section so that the liquid such as urine once having been absorbed by the third absorbent section may be absorbed by the second absorbent section and transfer of a liquid to the first absorbent section may be inhibited.

DESCRIPTION OF EMBODIMENTS

<First Embodiment>

FIGS. 1 through 4 illustrate a first embodiment of an absorbent sheet according to the present invention.

Figure 1:
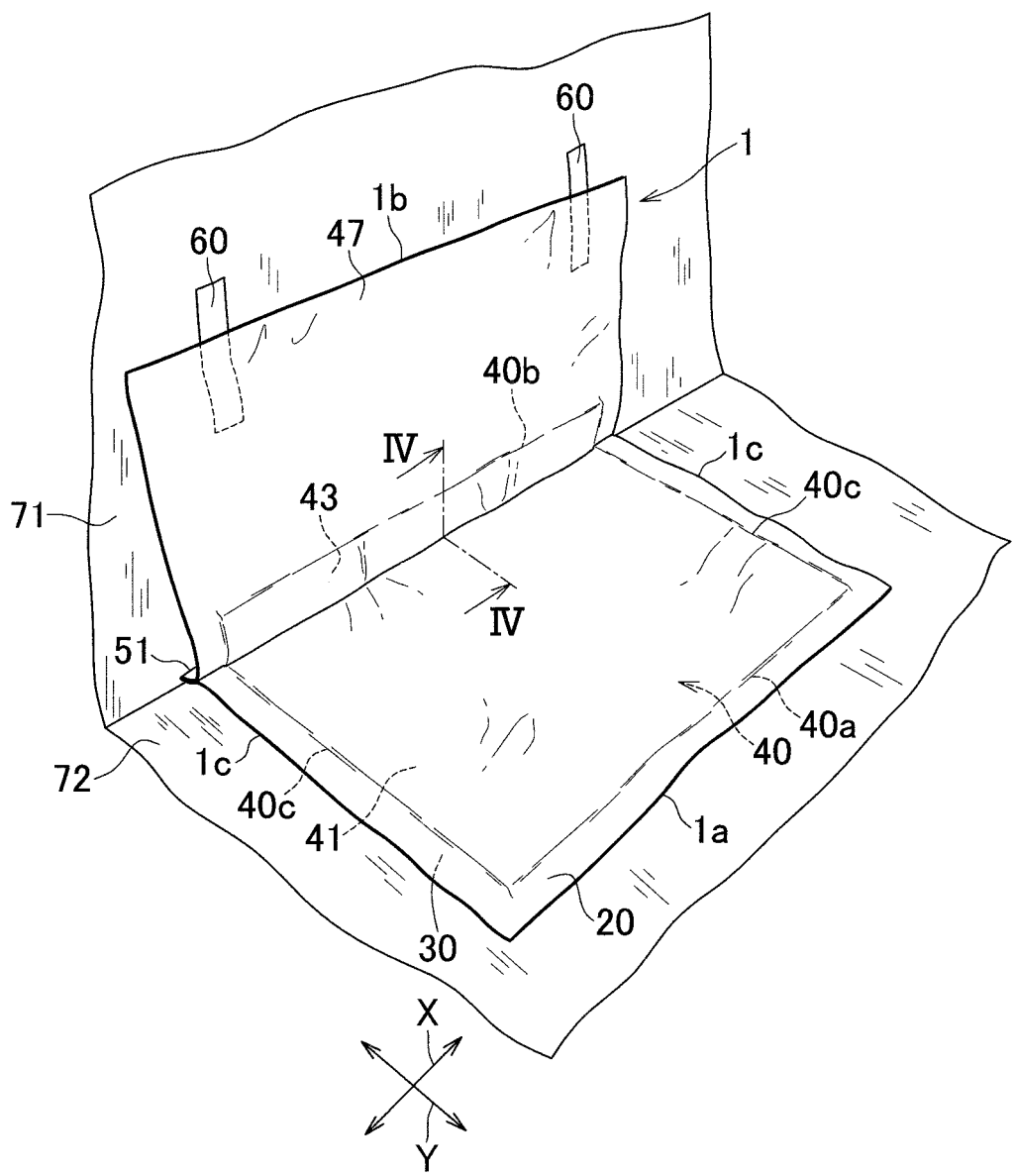
FIG. 1 is a perspective view illustrating an example of a manner of utilization of an absorbent sheet according to a first embodiment of the present invention.
Figure 2:
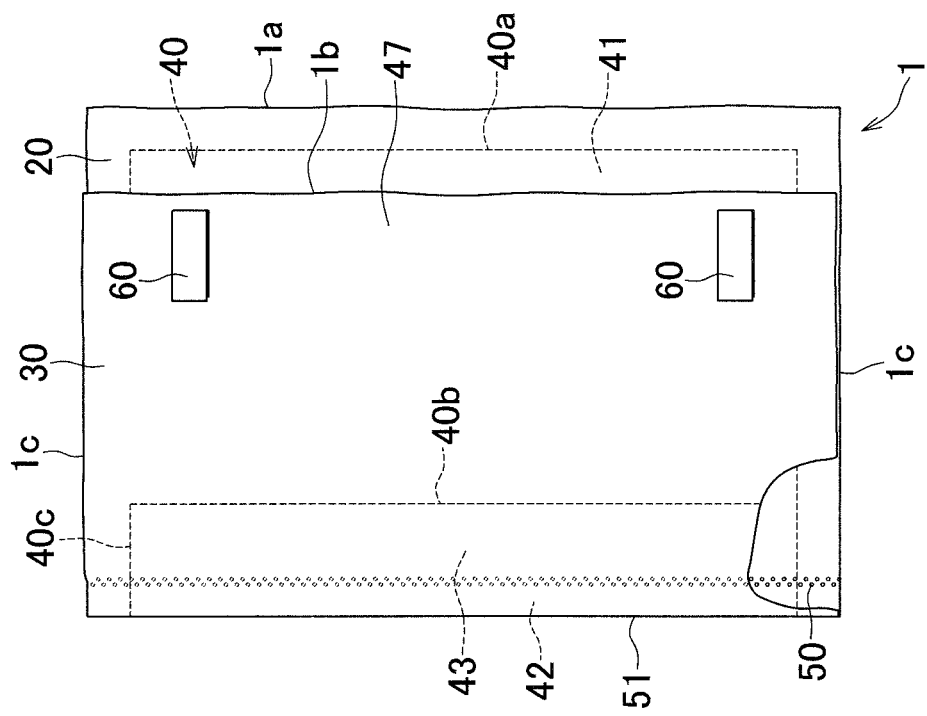
FIG. 2 is a plan view of the absorbent sheet.
Figure 3:
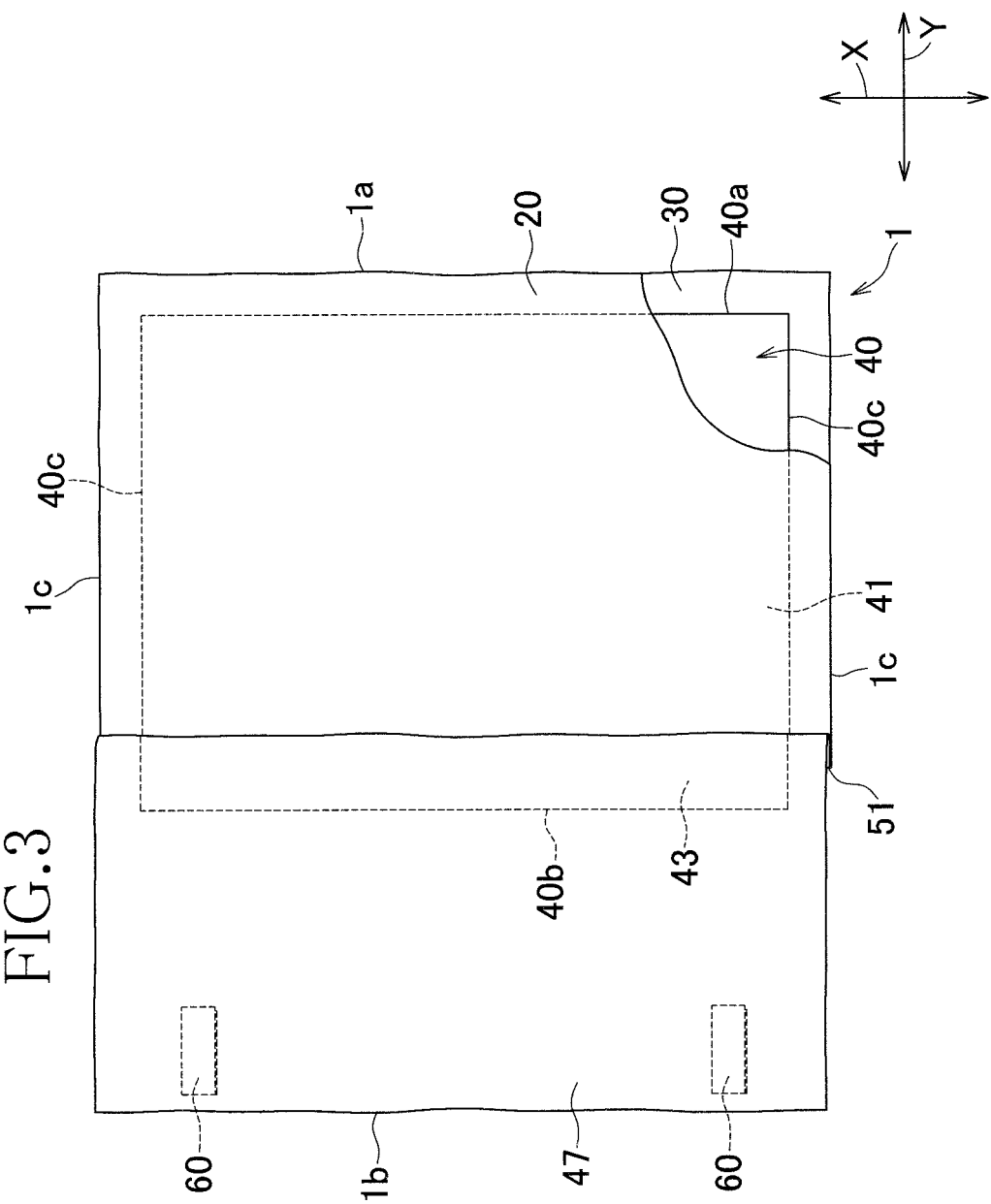
FIG. 3 is also a plan view of the absorbent sheet.
Figure 4:
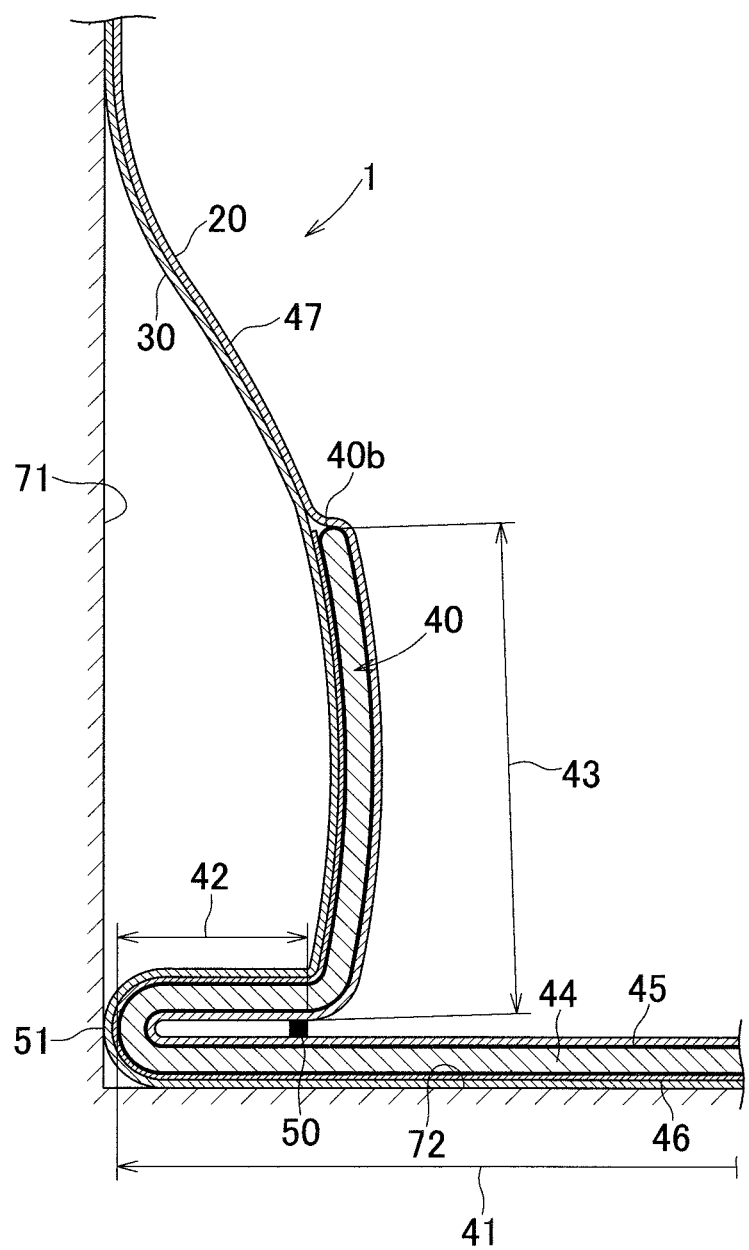
FIG. 4 is a sectional view taken along line IV-IV in FIG. 1.

FIG. 1 is a perspective view illustrating a manner of utilizing the sheet 1, FIG. 2 is a plan view of the sheet 1 in a state folded along a fold edge 51, FIG. 3 is a plan view of the sheet 1 in a state unfolded and FIG. 4 is a sectional view taken along line IV-IV in FIG. 1.

Referring to FIGS. 1 through 4, the sheet 1 has a longitudinal direction Y and a transverse direction X and is contoured by front and rear end edges 1a, 1b extending in the transverse direction X and a pair of side edges 1c extending in the longitudinal direction Y. The sheet 1 includes a liquid-permeable topsheet 20, a liquid-impermeable backsheet 30 and a liquid-absorbent structure 40 interposed between the sheets 20, 30. The topsheet 20 and the backsheet 30 are the same in size as well as in shape and are approximately rectangular.

The absorbent structure 40 is contoured by front and rear end edges 40a, 40b extending in the transverse direction X and a pair of side edges 40c extending in the longitudinal direction Y. The absorbent structure 40 is dimensioned to be smaller than the topsheet 20 as well as the backsheet 30 and the topsheet 20 and the backsheet 30 are secured to each other outboard of the absorbent structure 40 by a joining means (not shown) such as a hot melt adhesive. The topsheet 20 may be formed of a known fibrous nonwoven fabric, for example, a thermally bonded fibrous nonwoven fabric. The backsheet 30 may be formed of, for example, a polyolefin-based plastic sheet or a laminate composed of such a plastic sheet and a nonwoven fabric.

Referring to FIG. 2, the sheet 1 is folded and two layers of the topsheet 20 facing each other are secured together along joining means 50 extending in the transverse direction X. In consequence, the sheet 1 is formed with a fold edge 51 extending in the transverse direction X. The fold edge 51 is formed in a region of the sheet 1 including the absorbent structure 40. As the joining means 50, for example, a hot melt adhesive may be used.

Referring to FIG. 4, the absorbent structure 40 includes absorbent core material 44, a wrapping sheet 45 and a leakage barrier sheet 46 interposed between the wrapping sheet 45 and the backsheet 30. As the absorbent core material 44, wood fluff pulp, superabsorbent polymer particles or a mixture thereof may be used. As the wrapping sheet 45, for example, tissue paper may be used. As the leakage barrier sheet 46, a liquid-impermeable plastic film may be used.

The absorbent structure 40 may be sectionalized into a first absorbent section 41, a second absorbent section 42 and a third absorbent section 43 lined up from the front end edge 1a toward the rear end edge 1b of the sheet 1. In this regard, these first absorbent section 41 through the third absorbent section 43 are continuous to one to another in the longitudinal direction Y and the absorbent core material 44 forming these sections are not divided one from another. Specifically, the first absorbent section 41 is defined by a region extending from a front end edge 40a of the absorbent structure 40 to the fold edge 51, the second absorbent section 42 is defined by a region extending from the fold edge 51 to the joining means 50 and the third absorbent section 43 is defined by a region extending from the joining means 50 to a rear end edge 40b of the absorbent structure 40. In this way, the joining means 50 is provided between the second and third absorbent sections 42, 43 and the portion of the topsheet 20 lying in the first absorbent section 41 faces the portions of the topsheet 20 lying the second and third absorbent sections 42, 43 so as to bond these portions along the joining means 50 The second absorbent section 42 is layered on the first absorbent section 41 in the thickness direction so that the respective portions of the topsheet in these first and second absorbent sections 41, 42 may face each other.

The sheet 1 is formed outboard of the third absorbent section 43 in the longitudinal direction Y with a non-absorbent region 47 in which the absorbent structure 40 does not exist. In this non-absorbent region 47, the topsheet 20 and the backsheet 30 are joined to each other with, for example, a hot melt adhesive.

In the non-absorbent region 47 of the sheet 1, the backsheet 30 is provided with attachments 60. Specifically, pressure-sensitive adhesive tapes may be used as the attachments 60 and the adhesive tapes may be folded inwardly so that the adhesive surface thereof might not be exposed before actual use. In actual use, the adhesive surface may be exposed and attached to the wall 71 so that the third absorbent section 43 and the non-absorbent region 47 may be retained to the wall 71.

When the sheet 1 described above is actually used, after the first absorbent section 72 has been laid on the floor 72, the third absorbent section 43 and the non-absorbent region 47 may be folded upward around the joining means 50 so as to be raised from the first absorbent section 41. The third absorbent section 43 and the non-absorbent region 47 raised in this manner may be placed so as to extend along the wall and may be secured to the wall 71 with use of the attachments 60. In this state, the second absorbent section 42 extends from the third absorbent section 43 to the wall 71. In the same state, the backsheet 30 faces the floor 72 and the wall 71 while the topsheet 20 is exposed on the opposite side. Even if the pet animal discharges urine against the sheet 1 set in this manner, it is possible to prevent the urine from spattering on the wall 71 since the wall 71 is protectively covered with the non-absorbent region 47 and the third absorbent section 43 of the sheet 1. Particularly a male dog has a habit of lifting his one paw to discharge urine against a relatively high target and, even in such a case, the sheet 1 partially covering the wall 71 prevents the wall 71 from being soiled with the discharged urine. The urine discharged against the non-absorbent region 47 transfers downward to the third absorbent section 43 and absorbed by the portion of the absorbent core material 44 contained within this third absorbent section 43. An excess amount of the urine beyond the absorbent capacity of the third absorbent section 43 transfers further downwards to the side of the floor 72 and is absorbed by the second absorbent section 42 which is contiguous to the third absorbent section 43. An excess amount of the urine beyond the absorbent capacity of the second absorbent section 42 further transfers to the first absorbent section 41 and is absorbed by this section 41.

The second absorbent section 42 of the absorbent structure 40 advantageously functions to reduce the amount of urine which transfer to the first absorbent section 41 compared to if the absorbent structure 40 is not disposed with the second absorbent section 42. If the first absorbent section 41 laid on the floor 72 is soiled with excrement such as urine over its wide range, there is a possibility that the pet animal might step thereon and that the urine might leak out of this first absorbent section 41. However, due to the provision of the second absorbent section 42, the area of the first absorbent section 41 which might be soiled may be reduced, thereby eliminating such inconvenience.

According to this embodiment, the urine transferring from the third absorbent section 43 can be absorbed by the second absorbent section 42 placed more closely to the wall 71 than the third absorbent section 43. Considering the habit of the pet animal discharging urine from the position on the side of the topsheet 20 against the wall 71, the second absorbent section 42 placed close to the wall 71 assures to retain the urine at a distance from the pet animal, thereby preventing the pet animal from coming in contact with the urine retained by the second absorbent section 42.

In addition, the second absorbent section 42 has a retention capability sufficient to inhibit urine diffusion in the first absorbent section 41 after a predetermined time has elapsed.

At least the second and third absorbent section 42, 43 are preferable to have a water-retention capacity in a range of 500 to 4000 $g/m^2$. In this regard, according to the present embodiment, the first-third absorbent sections 41-43 are formed of the same material and approximately the same water retention capacity is assured over the all absorbent sections. If the water retention capacity is lower than 500 $g/m^2$, it will be difficult for the second and third absorbent section 42, 43 to absorb the amount of urine beyond the capacity of these sections 42, 43 and the excess amount of urine will transfer to the first absorbent section 41 whereby urine will diffuse in the first absorbent section 41 over a wide range. Though it is possible to enhance the water retention capacity and thereby to reduce the amount of urine transferring to the first absorbent section 41 but such countermeasure will often increase an amount of the absorbent core material leading to a thick absorbent structure 40. If the water retention capacity exceeds 4000 g/m², the second and third absorbent sections 42, 43 will become heavy due to the liquid absorbed thereby and the attachments 60 might be peeled off the wall 71 and/or the third absorbent section 43 in its upstanding posture might collapse.

<Method of Measuring a Water Retention Capacity>

Measurement of a water retention capacity was carried out on the absorbent structure 40 of the sheet 1 having absorbed 0.9% aqueous solution of NaCl. More specifically, the measurement was carried out by the following steps. First, an initial mass of the sheet 1 and an area of the absorbent structure were measured. Then, the sheet 1 was immersed in 20 l of the aqueous solution of NaCl for 10 minutes in such a manner that the sheet 1 was entirely immersed in the aqueous solution of NaCl. After 10 minutes, the sheet 1 was taken out of the aqueous solution and left as it is for 10 minutes to be naturally dehydrated. More specifically, the sheet 1 was doubled up with the topsheet 20 exposed outward and this doubled-up sheet 1 was hung from an approximately horizontal bar so that the sheet may stride over the bar along the fold edge and left indoors for 10 minutes. The sheet 1 was dehydrated by a dewatering equipment under a mass of 150 g for 90 seconds. The sheet 1 having been dehydrated in this manner was measured. Water retention capacity was calculated according to the following calculating formula:

$$\{(\text{mass of the sheet after dehydrating step})-(\text{initial mass of the sheet})\}/\text{area of the absorbent structure} \times 100$$

A length dimension in the longitudinal direction Y of the third absorbent section 43 is preferable in a region of about 20 mm to about 100 mm. If this length dimension is smaller than 20 mm, the amount of urine to be absorbed by the third absorbent section 43 would be inhibited and the excess amount of urine might transfer not to the second absorbent section 42 but directly to the first absorbent section 41. In such a case, the urine having transferred directly to the first absorbent section 41 might diffuse over a wide region of this first absorbent section 41. In contrast, if the length dimension is larger than 100 mm, the absorbed amount of urine would be increased and the mass of the third absorbent section 43 would correspondingly increase. Eventually, the attachments 60 might be peeled off the wall 71 and/or the third absorbent section 43 might collapse from the standing position.

A length dimension in the longitudinal direction Y of the second absorbent section 42 is preferable in a range of about 10 mm to about 50 mm. If this length dimension is smaller than 10 mm, a water retention capacity of the second absorbent section 42 would unacceptably decrease and an amount of urine transferring to the first absorbent section 41 will correspondingly increase. In contrast, if the length dimension is larger than 50 mm, a range extending from the third absorbent section 43 to the wall 71 would be unacceptably enlarged and the joining means 50 above which the third absorbent section 43 stands up will be unacceptably distanced from the wall 71. If the joining means 50 is unacceptably distanced from the wall 71, the pet animal, for example, a dog might step on the third absorbent section 43 normally in a upstanding posture and eventually the attachments 60 might be peeled off the wall 71. In this regard, the water retention capacity of the second absorbent section 42 depends also upon the type and the amount of the absorbent core material and the above-mentioned length dimension may be sometimes determined in consideration of the water retention capacity.

The third absorbent section 43 is formed with the non-absorbent region 47 in which the absorbent structure is not disposed. The non-absorbent region 47 approximately has no urine retention capacity and functions, particularly in an upper portion in the upstanding section of the sheet 1, to prevent the sheet 1 from becoming heavy due to the urine. If the portion of the sheet 1 in the upstanding posture becomes heavy, the attachments 60 might be peeled off the wall 71. However, the provision of the non-absorbent region makes it possible to prevent the attachments 60 from being peeled off, thereby preventing the portion of the sheet 1 in the upstanding posture from collapsing.

The inventors conducted a series of confirmatory test for liquid diffusivity on an embodiment of the present invention and comparative examples. The sheet 1 as a sample of the embodiment included a first absorbent section 41, a second absorbent section 42 and a third absorbent section 43 formed in a continuous manner. A length dimension in the longitudinal direction Y of the second absorbent section 42 was about 20 mm and a length dimension in the longitudinal direction Y of the third absorbent section 43 was about 40 mm. A sample of the comparative example 1 included neither the second absorbent section nor the third absorbent section. In other words, the comparative example 1 only included the first absorbent section but similar to the embodiment of the present invention in other aspects. A sample of the comparative example 2 lacked the third absorbent section but was similar to the embodiment of the present invention in other aspects. A sample of the comparative example 3 lacked the second absorbent section but was similar to the embodiment of the present invention in other aspects.

<Confirmatory Test Method for Liquid Diffusivity>

Each of the samples was put in a posture standing on the joining means 50 serving as the base point and attached to the wall by the attachments 60. A tilt angle of the sheet relative to the wall was set to about 4°. At a position 200 mm distanced from the joining means 50 toward the non-absorbent region 47, 40 ml of 0.90% aqueous solution of NaCl was dropped to the respective samples with use of a syringe (needleless Terumo syringe of 50 ml capacity). More specifically, aqueous solution of NaCl was dropped, spending about 10 seconds, from a point 10 mm above the topsheet almost vertically to the topsheet.

An amount of the aqueous solution which had transferred along the surface of the topsheet toward the first absorbent section 41 after the dropping of the aqueous solution had started was determined as a liquid transfer length and an amount of the aqueous solution which had transferred to the first absorbent section 41 10 seconds after the dropping of the aqueous solution was determined as a liquid diffusion length after 10 seconds and an amount of the aqueous solution which had transferred to the first absorbent section 41 after the dropping of the aqueous solution had started was determined as a liquid diffusion length after 1 minute. The liquid transfer length was measured by visually confirming the liquid having transferred through the topsheet 20 and by measuring a transfer length from the joining means to the most remote attained point on the side of the front end edge 1a of the sheet 1. With respect to the diffusion length after 10 seconds and the diffusion length after 1 minute, the solution transferring to the first absorbent section 41 were visually confirmed through the topsheet 20 and the respective diffusion lengths from the joining means to the respective most remote points on the front end edge 1a were measured. Such measurements were conducted three times and respective average values were calculated.

TABLE 1

| | Example | Comparative example 1 | Comparative example 2 | Comparative example 3 |
|---|---|---|---|---|
| Liquid transfer length | 15 mm | 70 mm | 70 mm | 50 mm |
| Diffusion length after 10 sec | 64 mm | 100 mm | 100 mm | 85 mm |
| Diffusion length after 1 min | 75 mm | 136 mm | 132 mm | 108 mm |

Referring to TABLE 1, in all the comparative examples 1 through 3, the liquid transfer length, the diffusion length after 10 seconds and the diffusion length after 1 minute suggest that the solution diffuses over significantly wider ranges of the first absorbent section 41 in comparison to the result measured for the embodiment of the present invention (Example in TABLE 1). In this regard, though not indicated in TABLE 1, from the similar test conducted to the other two embodiments of the present invention, i.e., the embodiment in which the second absorbent section and the third absorbent section were not integral with each other and the embodiment in which the first absorbent section and the second absorbent section were not integral with each other, approximately the same result was obtained and the solution diffusion into the first absorbent section was more reliably inhibited than in the comparative examples 1 through 3.

<Second Embodiment>

Figure 5:
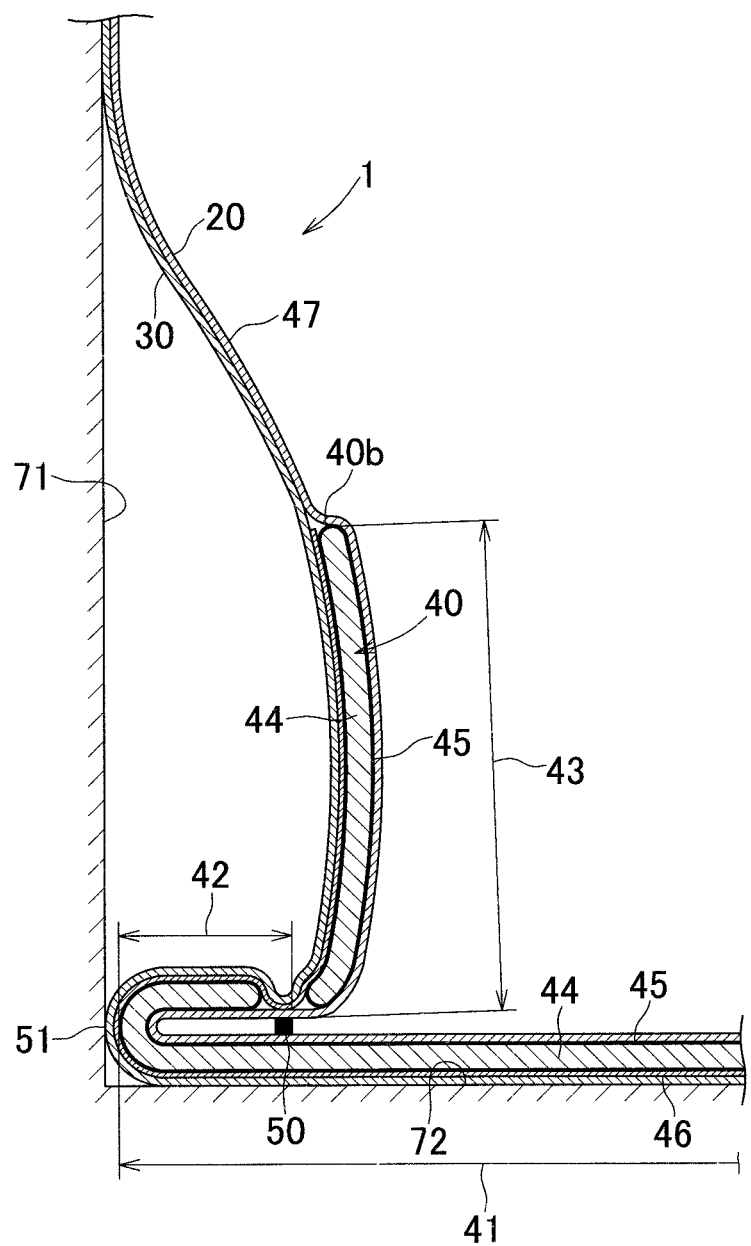
FIG. 5 is a sectional view of the absorbent sheet according to a second embodiment.

FIG. 5 is a sectional view similar to FIG. 4 and illustrates a second embodiment of the present invention. As illustrated, according to this embodiment, the second absorbent section 42 and the third absorbent section 43 are separated from each other in the longitudinal direction Y so far as the absorbent core material 44 contained in these sections 42, 43 is concerned. Specifically, the second absorbent section 42 and the third absorbent section 43 respectively include the absorbent core material 44 wrapped with separate wrapping sheets 45 and, in consequence, these second and third absorbent sections 42, 43 are not functionally continuous with each other in the longitudinal direction Y. The other components are arranged in the same manner as in the first embodiment. The components similar to those in the first embodiment are designated with the same reference numerals used for the first embodiment and these components will not be repetitively described.

According to this second embodiment, the topsheet 20 and the backsheet 30 are directly bonded to each other between the second and third absorbent sections 42, 43 so as to segment the second and third absorbent sections 42, 43. The joining means 50 is provided in an absorbent core material-free region defined between the second and third absorbent sections 20, 30, namely, a region in which the topsheet 20 and the backsheet 30 are directly bonded to each other. The first absorbent section 41 and the second absorbent section 42 are continuously and integrally formed.

By forming the second and third absorbent sections 42, 43 so that the absorbent core material 44 contained therein are neither continuous nor integral, a differential stiffness is generated between the core-free region and the core containing regions on both sides of the core-free region and the differential stiffness facilitates the sheet 1 to be easily folded around this core-free region. In consequence, this core-free region facilitates the third absorbent section 43 to be upstanding and facilitates the third absorbent section 43 and the non-absorbent region 47 to be attached to the wall 71. Furthermore, the joining means 50 formed between the second and third absorbent sections 42, 43 further increase a differential stiffness between the joining means 50 and the core containing regions and such differential stiffness facilitates the third absorbent section 43 to be folded relative to the first absorbent section 41 and thereby facilitates the third absorbent section to be upstanding.

As a result of delimiting the second and third absorbent sections 42, 43 in this manner, urine having been absorbed by the third absorbent section 43 does not directly transfer to the second absorbent section 42. However, the urine may transfer to the second absorbent section 42 along the topsheet 20. Consequently, it is possible to decrease the amount of urine which otherwise might transfer to the first absorbent section 41. Preferably, a length dimension by which the absorbent core material in the second absorbent section 42 is spaced from the absorbent core material in the third absorbent section 43 is about 10 mm or less. If the length dimension exceeds this limit, there is a possibility that the urine transfer from the third absorbent section 43 to the second absorbent section 42 might be held off.

<Third Embodiment>

Figure 6:
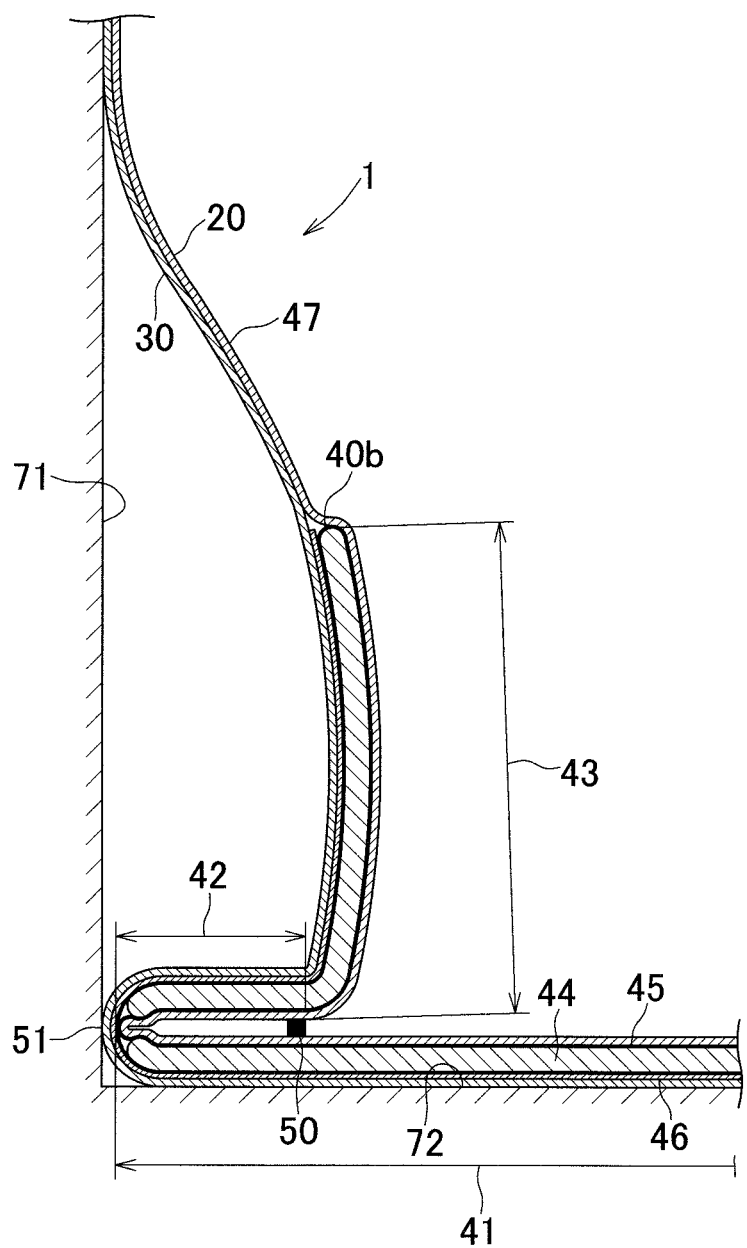
FIG. 6 is a sectional view of the absorbent sheet according to a third embodiment.

FIG. 6 is a sectional view similar to FIG. 4 and illustrates a third embodiment of the present invention. According to this embodiment, the first absorbent section 41 and the second absorbent section 42 are separately formed. The other components are arranged in the same manner as in the first embodiment. The components similar to those in the first embodiment are designated with the same reference numerals used for the first embodiment and these components will not be repetitively described.

According to this third embodiment, in a region delimiting the first absorbent section 41 and the second absorbent section 42 from each other, the topsheet 20 and the backsheet 30 are bonded to each other through the leakage barrier sheet 46. By delimiting the first absorbent section 41 and the second absorbent section 42 from each other in this manner, it is possible to fold the sheet 1 easily along this delimiting region and thereby to form the fold edge 51 easily. In this way, the sheet 1 may be easily folded on itself without losing its configuration and a packaging work may be facilitated. In this regard, the second absorbent section 42 and the third absorbent section 43 are continuously and integrally formed.

<Fourth Embodiment>

Figure 7:
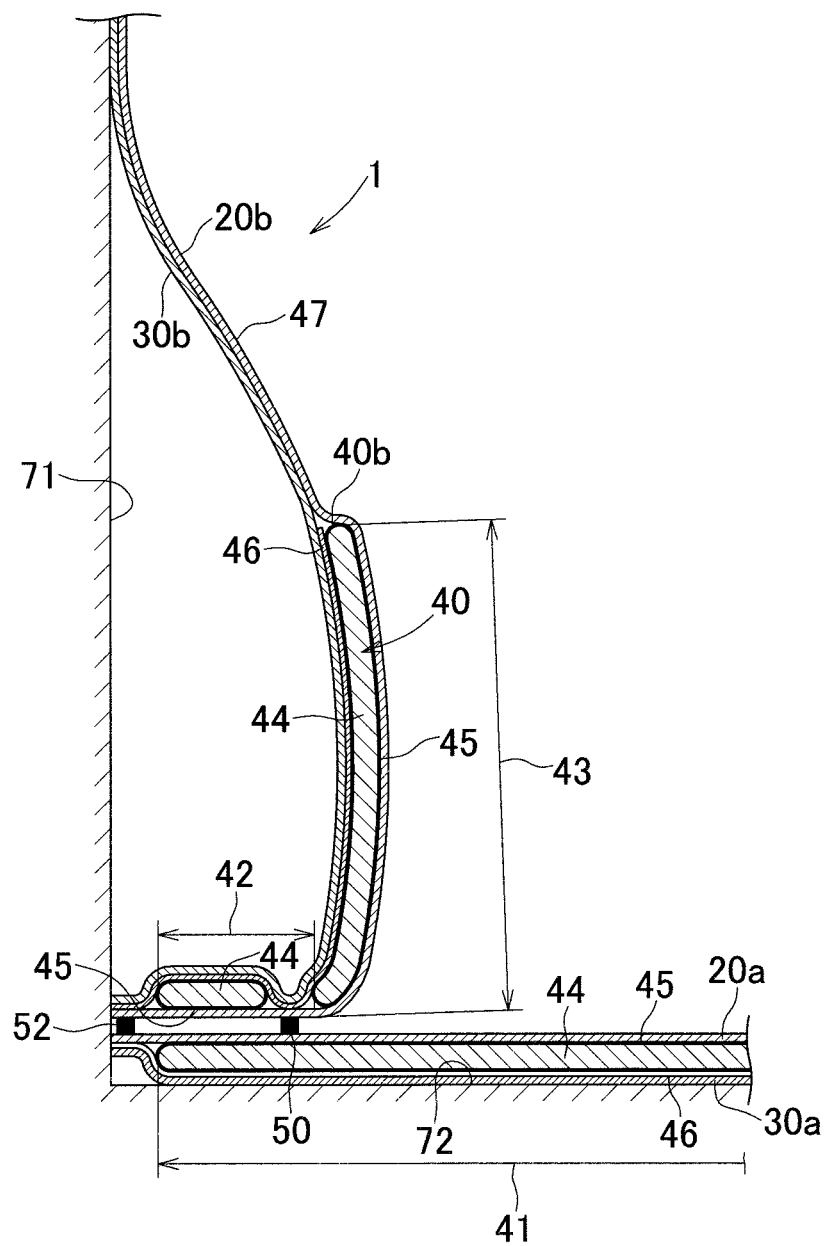
FIG. 7 is a sectional view of the absorbent sheet according to a fourth embodiment.

FIG. 7 is a sectional view similar to FIG. 4 and illustrates a fourth embodiment of the present invention. According to this embodiment, the first absorbent section 41 and the second absorbent section 42 are separated from each other in the longitudinal direction Y so far as the absorbent core material 44 contained in these sections 41, 42 is concerned and the topsheet and the backsheet covering these sections 41, 42 also are separated from each other in the longitudinal direction Y. More specifically, the sheet 1 includes a first topsheet 20a and a first backsheet 30a cooperating with each other to wrap the first absorbent section 41 and a second topsheet 20a and a second backsheet 30b cooperating with each other to wrap the second and third absorbent sections 42, 43. The other components are arranged in the same manner as in the first embodiment. The components similar to those in the first embodiment are designated with the same reference numerals used for the first embodiment and these components will not be repetitively described.

The first and second topsheets 20a, 20b are bonded to each other on the respective outer sides of the first and second topsheets 20a, 20b by joining means 52 extending in the transverse direction X. In consequence, no fold edge is formed between the first and second absorbent sections 41, 42. Provision of the joining means 52 makes it possible to prevent the animal excrement, for example, urine from leaking out from the first and second absorbent sections 41, 42 toward the wall 71.

While the first and second absorbent sections 41, 42 have been described so as to be separated from each other in a thickness direction according to the present invention including the embodiments as have been described above, it is possible to arrange these absorbent sections 41, 42 integrally. Specifically, for example, it is possible to wrap the absorbent core material contained in the first and second absorbent sections 41, 42 with a common wrapping sheet and/or to arrange in a manner that the topsheet 20 is not present between the first and second absorbent sections 41, 42.

While the first absorbent section 41 has been described so as to extend to a position under the second absorbent section 42 at which the first absorbent section 41 and the second absorbent section 42 are layered one upon another in the thickness direction so that the topsheet 20 may face itself, it is not essential for the present invention to layer the first absorbent section 41 and the second absorbent section 42 one upon another. For example, the first absorbent section 41 may have a length dimension extending from the front end edge 40a to the joining means 50 and not extending beyond the joining means 50 toward the fold edge 51. However, the second absorbent section 42 is preferably layered on the first absorbent section 41 in the thickness direction of the first absorbent section 41 in order to enlarge an area over which the first absorbent section 41 and the second absorbent section 42 kept in contact with each other and thereby to retain the second absorbent section 42 stably. Furthermore, with such arrangement, an excess amount of urine beyond the capacity of the second absorbent section 42 may be rapidly absorbed by the first absorbent section 41 and whereby leakage of urine may be prevented.

The disclosure of the present invention having been described hereinabove may be arranged as follows:

The absorbent sheet 1 has the longitudinal direction Y and the transverse direction X and includes the liquid-permeable topsheet 20, the liquid-impermeable backsheet 30 and the absorbent structure 40 interposed between these sheets 20, 30.

The absorbent sheet 1 according to the present invention lies in that: the absorbent structure 40 includes the first absorbent section 41, the second absorbent section 42 and the third absorbent section 43 arranged in the longitudinal direction Y; and the portion of the topsheet 20 extending between the second absorbent section 42 and the third absorbent section 43 and the portion of the topsheet 20 extending along the first absorbent section 41 are bonded to each other by the joining means 50.

The present invention having been described hereinabove may at least include embodiments as described below:

(1) The fold edge 51 extending in the transverse direction X is formed between the first absorbent section 41 and the joining means 50.

(2) The joining means 50 extends in the transverse direction X.

(3) The absorbent structure 40 further includes the non-absorbent region 47 in which the topsheet 20 and the backsheet 30 are directly bonded to each other outboard of the third absorbent section 43 in the longitudinal direction Y.

(4) The second absorbent section 42 and the third absorbent section 43 are formed so as to be continuous with each other.

(5) The first absorbent section 41 and the second absorbent section 42 are formed so as to be continuous with each other.

(6) The second absorbent section 42 is layered on the first absorbent section 41 in a thickness direction of the first absorbent section 41.

(7) The backsheet 30 is provided in the non-absorbent region 47 with attachments 60 adapted to attach the backsheet to an attachment object 71.

(8) The water retention capacity of the second and third absorbent sections 42, 43 is in a range of 500 to 4000 g/m$^2$.

(9) The third absorbent section 43 has a length dimension in the longitudinal direction Y in a range of 20 to 100 mm.

The constituent elements of the sheet 1 are not limited to those types of materials described in the specification but the other various types of materials widely used in the relevant technical field may be used without limitation unless otherwise stated. The terms "first", "second" and "third" used in the specification of the present invention are used merely to distinguish the similar elements, similar positions or the other similar means.

REFERENCE SIGNS LIST 1 absorbent sheet
20 topsheet
20a first topsheet
20b second topsheet
30 backsheet
30a first backsheet
30b second backsheet
40 absorbent structure
40a front end edge
40b rear end edge
41 first absorbent region
42 second absorbent region
43 third absorbent region
47 non-absorbent region
50 joining means
51 fold edge
60 attachments
71 attachment object (wall)
X transverse direction
Y longitudinal direction

The invention claimed is:

1. An absorbent sheet having a longitudinal direction and a transverse direction and including a liquid-permeable topsheet, a liquid-impermeable backsheet and an absorbent structure interposed between the topsheet and the backsheet, wherein:
    the absorbent structure includes a first absorbent section, a second absorbent section, and a third absorbent section arranged in the longitudinal direction,
    the topsheet has (i) a first portion extending between the second absorbent section and the third absorbent section, and (ii) a second portion extending along the first absorbent section, and
    the first portion of the topsheet and the second portion of the topsheet are directly joined to each other by a joining means at a joining region where the first and second portions of the topsheet face toward each other.

2. The absorbent sheet according to claim 1, further comprising a fold edge extending in the transverse direction between the first absorbent section and the second absorbent section.

3. The absorbent sheet according to claim 2, wherein, between the fold edge and the joining means, the second absorbent section overlaps the first absorbent section in a thickness direction of the first absorbent section.

4. The absorbent sheet according to claim 1, wherein the joining means extends in the transverse direction.

5. The absorbent sheet according to claim 1, wherein the absorbent structure further includes a non-absorbent region in which the topsheet and the backsheet are directly bonded to each other, and the non-absorbent region is outboard of the third absorbent section in the longitudinal direction.

6. The absorbent sheet according to claim 5, further comprising attachments in the non-absorbent region of the backsheet and adapted to attach the backsheet to an attachment object.

7. The absorbent sheet according to claim 1, wherein the second absorbent section and the third absorbent section are continuous with each other.

8. The absorbent sheet according to claim 1, wherein the first absorbent section and the second absorbent section are continuous with each other.

9. The absorbent sheet according to claim 1, wherein a water retention capacity of the second and third absorbent sections is in a range of 500 to 4000 g/m$^2$.

10. The absorbent sheet according to claim 1, wherein the third absorbent section has a length dimension in the longitudinal direction in a range of 20 to 100 mm.

11. The absorbent sheet according to claim 1, wherein
the absorbent sheet is folded to define a fold edge extending in the transverse direction and distanced away from the joining means in the longitudinal direction,
the absorbent structure has front and rear end edges opposing each other in the longitudinal direction,
the first absorbent section extends from the front end edge of the absorbent structure to the fold edge in the longitudinal direction,
the second absorbent section extends from the fold edge to the joining means in the longitudinal direction, and
the third absorbent section extends from the fold edge to the rear end edge of the absorbent structure.

12. The absorbent sheet according to claim 11, wherein
an area of the first absorbent section is larger than an area of the second absorbent section, and
the area of the first absorbent section is larger than an area of the third absorbent section.

13. An absorbent sheet, comprising:
a longitudinal direction and a transverse direction,
a liquid-permeable topsheet,
a liquid-impermeable backsheet,
an absorbent structure interposed between the topsheet and the backsheet, and
a joining member,
wherein
the absorbent structure includes a first absorbent section, a second absorbent section, and a third absorbent section in the longitudinal direction,
the second absorbent section is disposed between and connects the first and third absorbent sections,
the joining member directly joins (i) a first portion of the topsheet extending between the second absorbent section and the third absorbent section to (ii) a second portion of the topsheet extending along the first absorbent section together, at a joining region where the first and second portions of the topsheet face toward each other,
the absorbent sheet is folded to define a fold edge extending in the transverse direction and disposed between the first absorbent section and the second absorbent section,
the second absorbent section extends from the joining member to the fold edge in the longitudinal direction, and
the third absorbent section is configured to be folded along the joining member away from the first absorbent section.

14. The absorbent sheet according to claim 13, wherein the second absorbent section overlaps the first absorbent section in a thickness direction of the first absorbent section.

15. The absorbent sheet according to claim 14, wherein
the absorbent structure further includes a non-absorbent region in which the topsheet and the backsheet are directly bonded to each other.

16. The absorbent sheet according to claim 15, wherein the non-absorbent region is arranged between the second and third absorbent sections in the longitudinal direction, and the first and second absorbent sections are continuous with each other.

17. The absorbent sheet according to claim 15, wherein the non-absorbent region is arranged between the first and second absorbent sections in the longitudinal direction, and the second and third absorbent sections are continuous with each other.

18. The absorbent sheet according to claim 17, wherein the non-absorbent region defines the fold edge.

19. The absorbent sheet according to claim 14, wherein the joining member is disposed, in the thickness direction, between the first portion of the top sheet and the second portion of the top sheet.

20. The absorbent sheet according to claim 19, wherein the joining member is adhesive.

21. The absorbent sheet according to claim 13, wherein
the absorbent structure further includes a non-absorbent region in which the topsheet and the backsheet are directly bonded to each other,
the non-absorbent region is arranged at a position corresponding to the joining member and between the second and third absorbent sections in the longitudinal direction, and
the third absorbent section is configured to be folded at the non-absorbent region away from the first absorbent section.

22. An absorbent sheet, comprising:
a longitudinal direction and a transverse direction,
an absorbent structure including a first absorbent section, a second absorbent section, and a third absorbent section in the longitudinal direction,
a first liquid-permeable topsheet and a first liquid-permeable backsheet,
a second liquid-permeable topsheet and a second liquid-permeable backsheet; and
first and second joining members,
wherein
the first absorbent section is interposed between the first liquid-permeable topsheet and the first liquid-permeable backsheet,
the second and third absorbent sections are interposed between the second liquid-permeable topsheet and the second liquid-permeable backsheet,
the first liquid-permeable topsheet is directly joined to the second liquid-permeable topsheet by the first and second joining members,
the first joining member directly joins (i) a portion of the first liquid-permeable topsheet to (ii) a portion of the second liquid-permeable topsheet extending between the second absorbent section and the third absorbent section, at a joining region where (i) the portion of the first liquid-permeable topsheet and (ii) the portion of the second liquid-permeable topsheet face toward each other, and the second joining member is distanced away from the first joining member in the longitudinal direction.

* * * * *